UNITED STATES PATENT OFFICE.

HARVEY B. CORNELL, OF SCRANTON, PENNSYLVANIA, ASSIGNOR TO H. J. SEAMANS, OF SAME PLACE, AND G. W. PATTERSON, OF SAYRE, PENNSYLVANIA.

REFRIGERANT COMPOSITION.

SPECIFICATION forming part of Letters Patent No. 661,851, dated November 13, 1900.

Application filed July 2, 1900. Serial No. 22,367. (No specimens.)

*To all whom it may concern:*

Be it known that I, HARVEY B. CORNELL, a citizen of the United States, and a resident of Scranton, in the county of Lackawanna and State of Pennsylvania, have made a certain new and useful Invention in Refrigerant Compositions; and I declare the following to be a full, clear, and exact description of the same, such as will enable others skilled in the art to which it appertains to make and use the invention.

The invention has relation to compositions for cooling drinking-water, freezing ice-cream, and for other refrigerating purposes; and it consists in the novel combinations of ingredients, as hereinafter set forth.

The object of the invention is to reduce temperature, and the mixture employed for the purpose consists of sodium nitrate, ammonium nitrate, and ammonium muriate, the latter ingredient serving to aid in the recrystallization.

In preparing this composition I take usually about thirty parts, by weight, of the sodium nitrate and mix with this about fifty parts of the ammonium nitrate, adding one part of the ammonium muriate. When first prepared, as these chemicals come in large crystals or masses, these are broken up or comminuted to facilitate their dissolution. The composition thus formed can be used at once for a freezing mixture for any suitable purpose. When it is designed to use the mixture, an equal quantity of water is added to the amount of the mixture employed. In dissolving a remarkable low temperature is produced, this reaching, with agitation, two degrees below zero.

In preparing this composition I prefer to dissolve the ingredients in water, as above stated, and then to allow recrystallization, which results in converting the mass into long thin crystals of spiculate form, which on account of their size and shape are acted upon by water very quickly, so that the freezing or cooling action takes less time.

The proportion of the composition may be varied by using less of the sodium nitrate, which is more expensive than the ammonium nitrate. In the composition above referred to I may use as low as ten parts of the sodium nitrate; but the temperature will not be brought by such a composition quite so low as by the preferred proportions stated. The ammonium muriate is used to facilitate the recrystallization, and without it a very fine refrigerant is produced by the combination of the sodium nitrate and the ammonium nitrate. I prefer to add the small amount of ammonium muriate in order to lessen the size of the crystals, and thereby increase the efficiency of the composition.

This composition when put up in packages will keep for a long time without deliquescing. The ammonium nitrate is very hygrometric, as is well known, but when prepared with the sodium nitrate in the manner stated it keeps much better. As a refrigerant the composition is far more efficient than the ammonium nitrate or the sodium nitrate when either is employed without the admixture of the other substance.

Having described this invention, what I claim, and desire to secure by Letters Patent, is—

1. A refrigerant composition consisting of sodium nitrate and ammonium nitrate, combined and prepared, substantially as specified.

2. A refrigerant composition, consisting of sodium nitrate, ammonium nitrate and ammonium muriate, combined and prepared, substantially as specified.

3. A refrigerant composition consisting of sodium nitrate, ammonium nitrate and ammonium muriate dissolved and recrystallized, substantially as specified.

In testimony whereof I affix my signature in presence of two witnesses.

H. B. CORNELL.

Witnesses:
HERBERT C. EMERY,
GEORGE M. ANDERSON.